United States Patent
Sherrow (10) Patent No.: US 9,261,292 B2
(45) Date of Patent: Feb. 16, 2016

(54) FURNACE HEADER

(75) Inventor: Lester D. Sherrow, Mukwonago, WI (US)

(73) Assignee: Trane International Inc., Piscataway, NJ (US)

( * ) Notice: Subject to any disclaimer, the term of this patent is extended or adjusted under 35 U.S.C. 154(b) by 342 days.

(21) Appl. No.: 13/566,705

(22) Filed: Aug. 3, 2012

(65) Prior Publication Data
US 2014/0034038 A1 Feb. 6, 2014

(51) Int. Cl.
| F24H 8/00 | (2006.01) |
| F16T 1/00 | (2006.01) |
| F24H 3/08 | (2006.01) |

(52) U.S. Cl.
CPC .............. F24H 8/006 (2013.01); F24H 3/08 (2013.01); F24H 8/00 (2013.01); Y02B 30/102 (2013.01); Y02B 30/106 (2013.01); Y10T 137/0318 (2015.04); Y10T 137/5907 (2015.04)

(58) Field of Classification Search
CPC .......... F24H 3/065; F24H 3/006; F24H 8/006
USPC ................... 126/110 R, 116 R; 137/177, 179
See application file for complete search history.

(56) References Cited

U.S. PATENT DOCUMENTS

| 4,603,680 | A | | 8/1986 | Dempsey et al. | |
| 4,892,045 | A | | 1/1990 | Schumacher | |
| 5,309,890 | A | | 5/1994 | Rieke et al. | |
| 5,313,930 | A | | 5/1994 | Kujawa et al. | |
| 5,320,087 | A | * | 6/1994 | Froman | 126/110 R |
| 5,346,001 | A | | 9/1994 | Rieke et al. | |
| 5,347,980 | A | | 9/1994 | Shellenberger | |
| 5,375,586 | A | * | 12/1994 | Schumacher et al. | 126/110 R |
| 5,379,749 | A | | 1/1995 | Rieke et al. | |
| 5,437,263 | A | | 8/1995 | Ellingham et al. | |
| 5,582,159 | A | * | 12/1996 | Harvey et al. | 126/110 R |
| 5,623,918 | A | * | 4/1997 | Swilik et al. | 126/110 R |
| 5,704,343 | A | | 1/1998 | Ahn et al. | |
| 5,749,355 | A | | 5/1998 | Roan et al. | |
| 6,684,878 | B2 | | 2/2004 | Ho et al. | |
| 7,036,498 | B2 | * | 5/2006 | Riepenhoff et al. | 126/110 R |
| 7,418,827 | B2 | | 9/2008 | Rios | |
| 8,056,553 | B2 | | 11/2011 | Khan | |
| 2012/0090601 | A1 | * | 4/2012 | Goundiah Ramasamy et al. | 126/85 R |

* cited by examiner

*Primary Examiner* — Steven B McAllister
*Assistant Examiner* — Rabeeul Zuberi
(74) *Attorney, Agent, or Firm* — Conley Rose, P.C.; J. Robert Brown, Jr.; Michael J. Schofield (57) ABSTRACT

A furnace having a first drain trap, a first drain outlet associated with the first drain trap, and a second drain outlet associated with the first drain trap, wherein the first drain outlet and the second drain outlet are located relative to the first drain trap so that gravity driven drainage of a liquid from the first drain trap is selectable between the first drain outlet and the second drain outlet in response to a rotation of the furnace.

15 Claims, 11 Drawing Sheets

FIG. 14

FURNACE HEADER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Natural gas-fired and propane-fired furnaces are widely used in commercial and residential environments for heating, including space heating for air conditioning interior spaces. High-efficiency furnaces may extract enough heat from their exhausts so that water vapor condenses. Such high-efficiency furnaces may therefore be referred to as condensing furnaces.

SUMMARY OF THE DISCLOSURE

In some embodiments, a furnace is provided that comprises a first drain trap, a first drain outlet associated with the first drain trap, and a second drain outlet associated with the first drain trap, wherein the first drain outlet and the second drain outlet are located relative to the first drain trap so that gravity driven drainage of a liquid from the first drain trap is selectable between the first drain outlet and the second drain outlet in response to a rotation of the furnace.

In other embodiments, cold header for a furnace is provided that comprises a center housing, a first drain trap in fluid communication with the center housing, a first drain outlet in fluid communication with the first drain trap, and a second drain outlet in fluid communication with the first drain trap, wherein the first drain outlet and the second drain outlet are located relative to the first drain trap so that gravity driven drainage of a liquid from the first drain trap is selectable between the first drain outlet and the second drain outlet in response to a rotation of the cold header.

In yet other embodiments, a method of managing drainage of a liquid in a furnace is provided. The method may comprise providing a furnace comprising a cold header comprising a first drain trap, a first drain outlet associated with the first drain trap, and a second drain outlet associated with the first drain trap, wherein the first drain outlet and the second drain outlet are located relative to the first drain trap so that gravity driven drainage of a liquid from the first drain trap is selectable between the first drain outlet and the second drain outlet in response to a rotation of the cold header and rotating the furnace to select between the first drain outlet and the second drain outlet through which gravity driven drainage shall occur.

Embodiments described herein comprise a combination of features and advantages intended to address the needs described above. The various characteristics described above, as well as other features, will be readily apparent to those skilled in the art upon reading the following detailed description and by referring to the accompanying drawings.

BRIEF DESCRIPTION OF THE DRAWINGS

For a detailed description of the embodiments of the disclosure, reference will now be made to the accompanying drawings in which.

DETAILED DESCRIPTION

Condensing furnaces may produce many gallons of condensate per hour, and that condensate may accumulate in the furnace and damage the furnace. In addition, standing condensate may promote bacterial growth. The combustion gases generated by the furnace may comprise gases that are harmful to humans. In some cases, air external to a combustion gas flow path may disrupt proper combustion and prevent the condensate from draining is not properly managed. A condensing furnace may therefore need to drain condensate, prevent combustion gases from exiting into a conditioned space, and prevent outside air from entering the furnace. In some embodiments, a cold header may provide a route to drain the condensate and provide a barrier against entry of the outside air.

Figure 1:
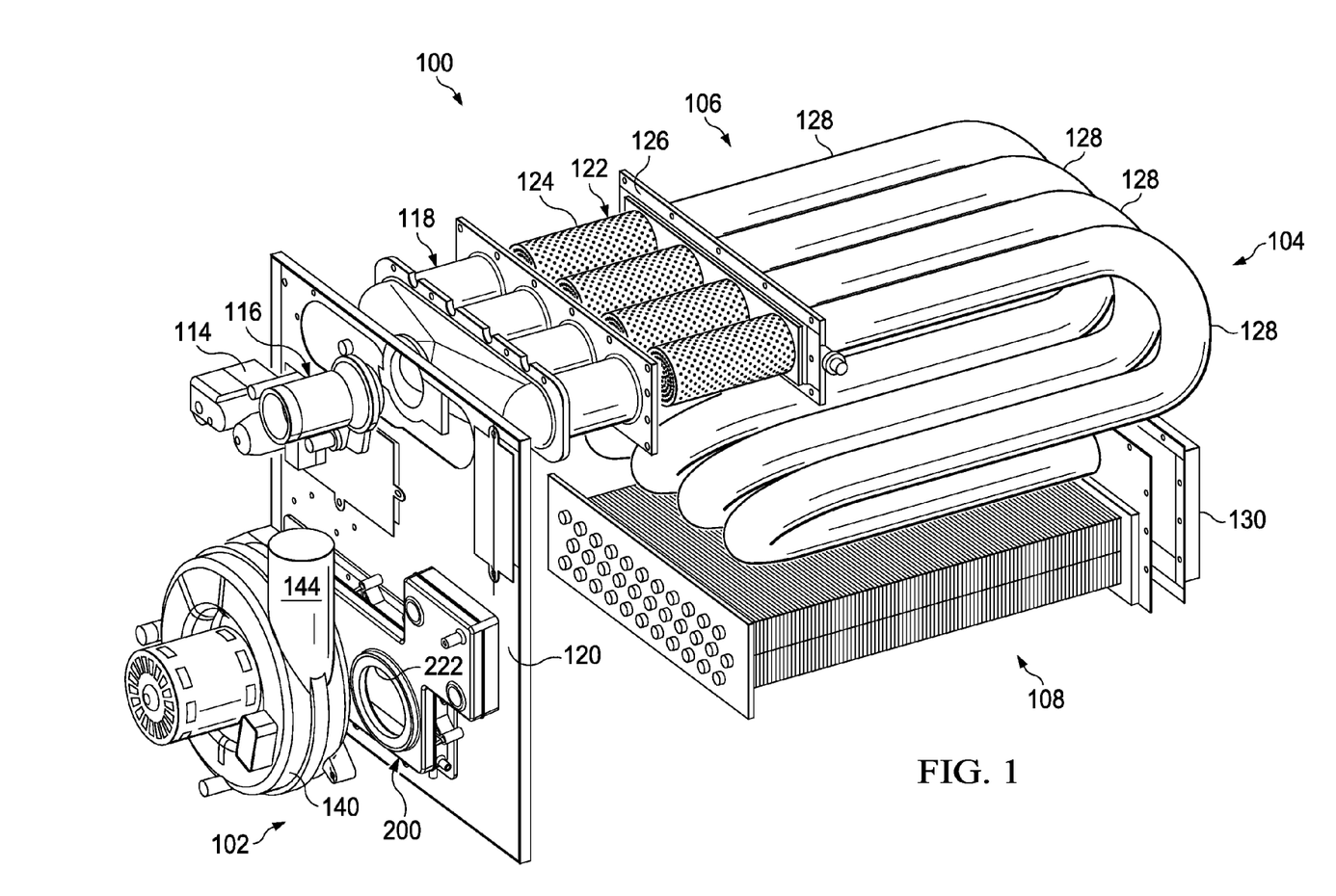
FIG. 1 is an oblique exploded view of a furnace according to an embodiment of the disclosure.
Figure 2:
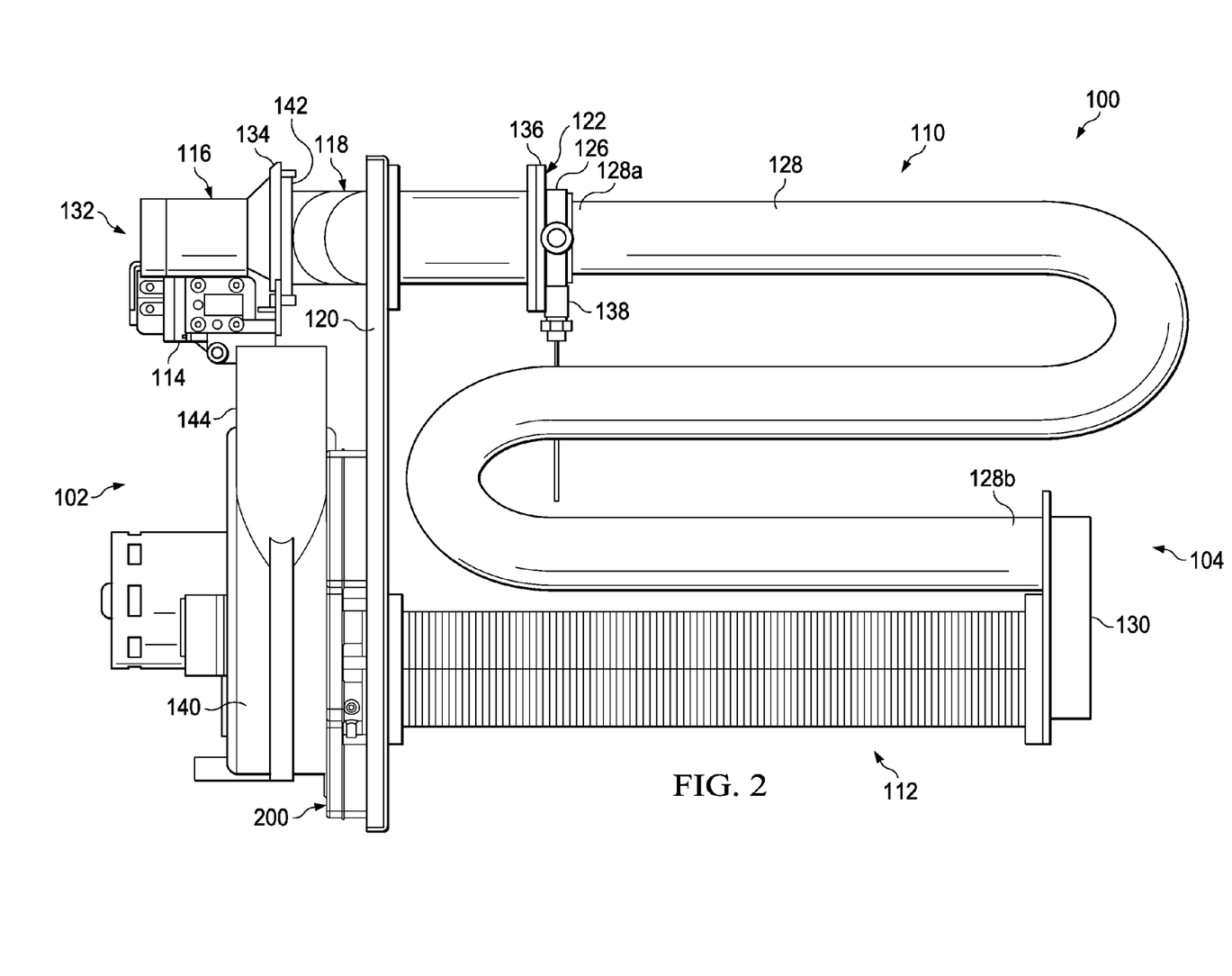
FIG. 2 is an orthogonal right side view of the furnace of FIG. 1.
Figure 3:
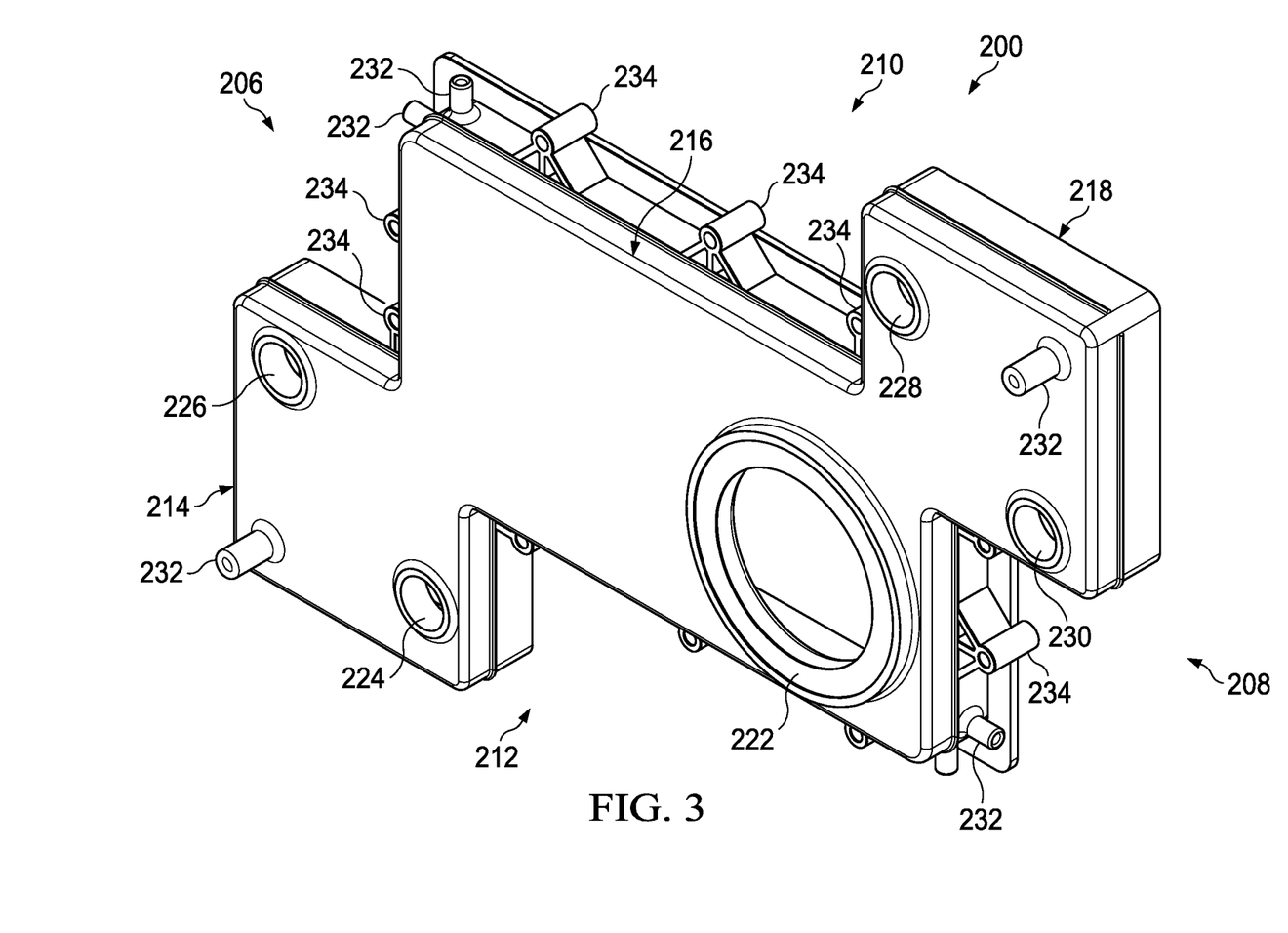
FIG. 3 is an oblique front view of a cold header of the furnace of FIG. 1.
Figure 4:
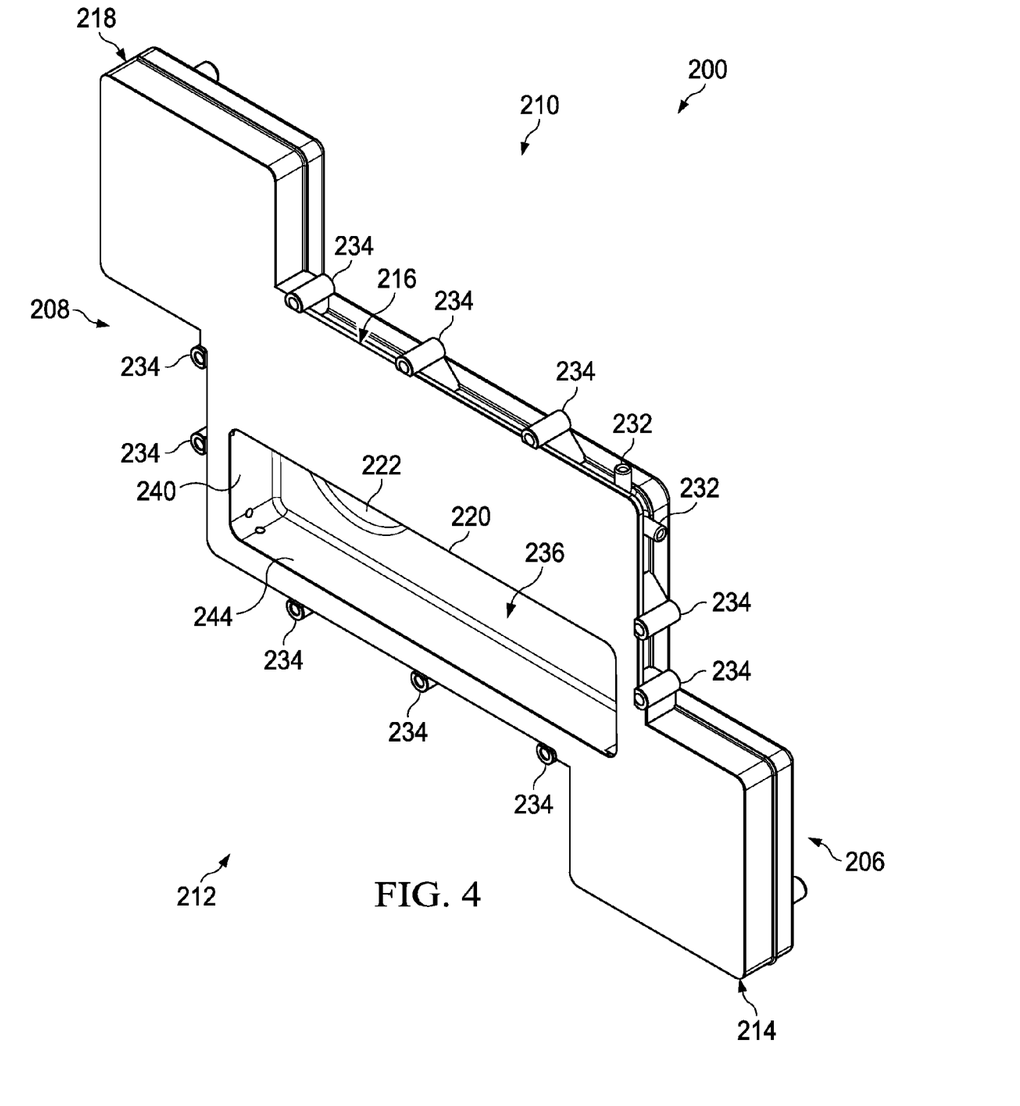
FIG. 4 is an oblique rear view of the cold header of FIG. 3.
Figure 5:
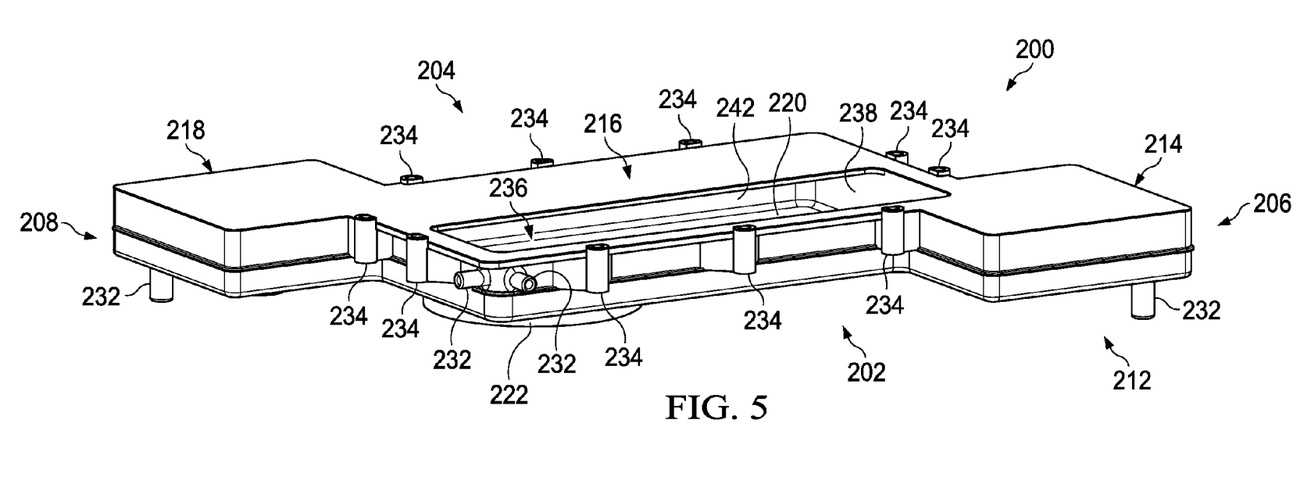
FIG. 5 is an oblique bottom rear view of the cold header of FIG. 3.
Figure 6:
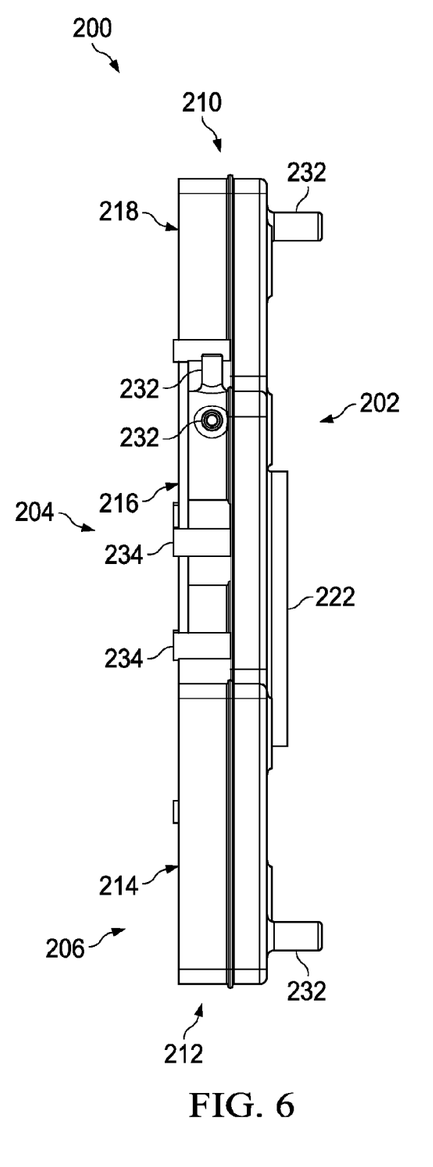
FIG. 6 is an orthogonal left view of the cold header of FIG. 3.
Figure 7:
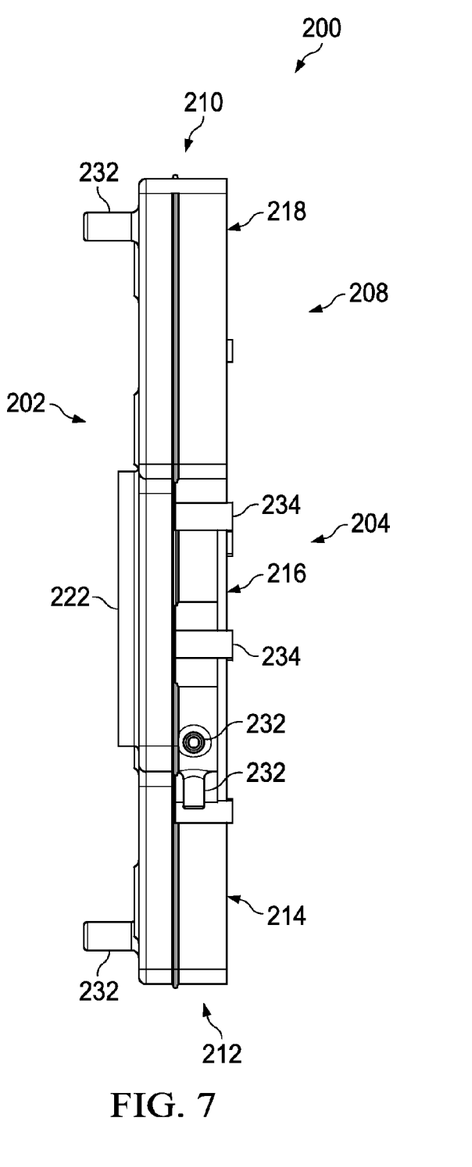
FIG. 7 is an orthogonal right view of the cold header of FIG. 3.
Figure 8:
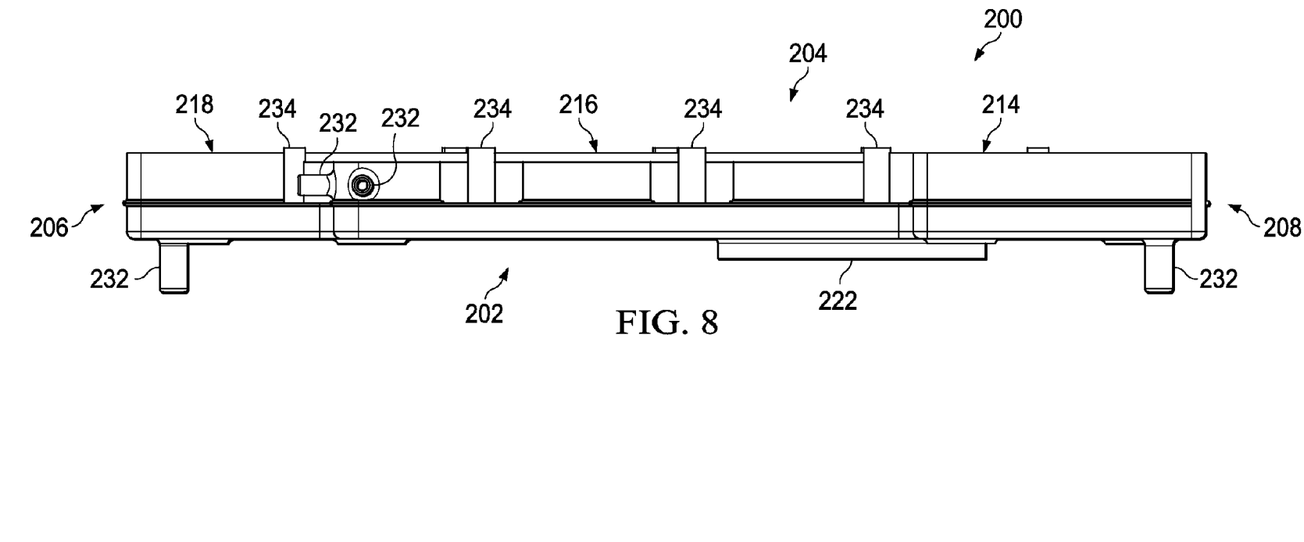
FIG. 8 is an orthogonal top view of the cold header of FIG. 3.
Figure 9:
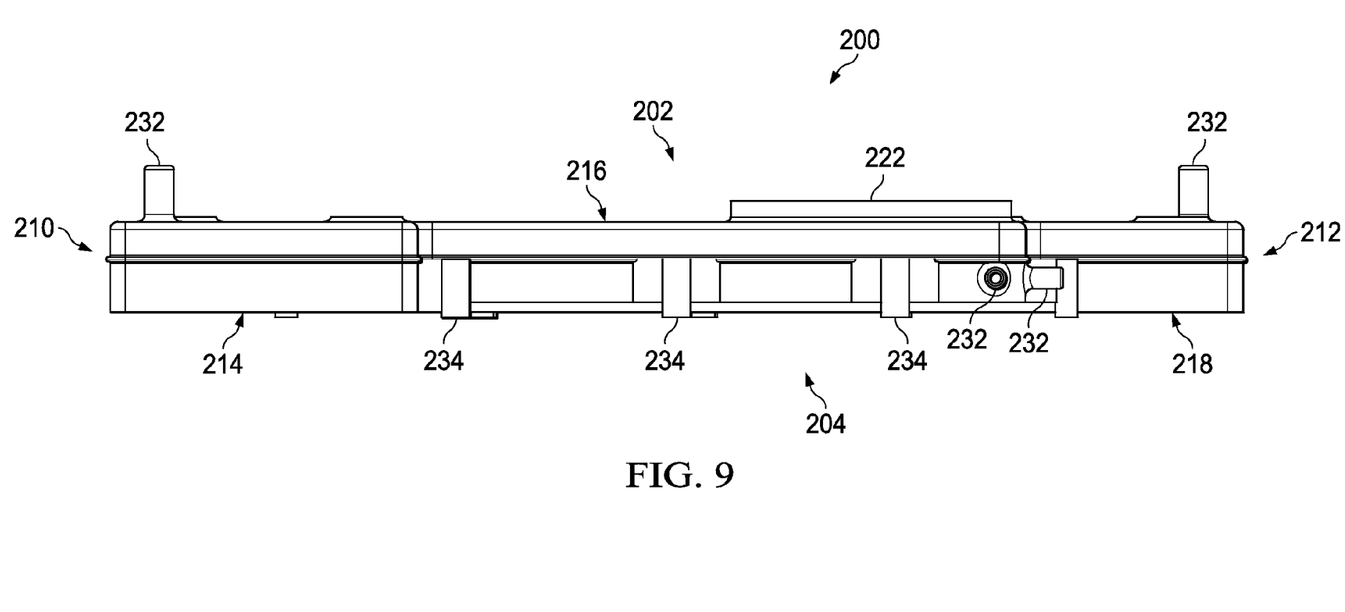
FIG. 9 is an orthogonal bottom view of the cold header of FIG. 3.

Referring now to FIGS. 1 and 2, a condensing gas-fired furnace 100 according to an embodiment of the disclosure is shown. In this embodiment, the furnace 100 is configured as an indoor furnace 100 that provides conditioned, heated air to an interior space. The components of the furnace 100, however, may be equally employed in an outdoor or weatherized furnace to condition an interior space. Moreover, the furnace 100 may be used in residential or commercial applications. The furnace 100 may generally comprise a front side 102, rear side 104, left side 106, right side 108, top side 110, and bottom side 112.

In this embodiment, the furnace 100 may comprise a gas supply valve 114, an air/fuel mixing tube 116, an intake manifold 118, a partition panel 120, a burner assembly 122, a post-combustion chamber 126, a plurality of primary heat exchangers 128, and a finned, condensing, secondary heat exchanger 130. As best shown in FIG. 2, the mixing tube 116 may be coupled end-to-end with the intake manifold 118, the burner assembly 122 may be positioned between the intake manifold 118 and the post-combustion chamber 126, and the primary heat exchangers 128 may extend from the post-combustion chamber 126 to the secondary heat exchanger 130. In addition, the intake manifold 118 may be secured to and extend through the partition panel 120, which may aid in mounting and orienting several components of the furnace 100.

An annular connection flange 134 may extend radially outward from the mixing tube 116. The connection flange 134 may couple the mixing tube 116 to the intake manifold 118. Fuel may be introduced to the mixing tube 116 by the gas supply valve 114 mounted thereto, and air may be introduced to the mixing tube 116 via the air inlet 132. Because fuel and air may be introduced to the mixing tube 116 to allow mixing before combustion, this particular embodiment may be described as a "pre-mix" furnace. The gas supply valve 114 may be adjusted either electrically or pneumatically to obtain the correct air/fuel ratio for increased efficiency and lower nitrogen oxide emissions. In addition, the gas supply valve 114 may be configured for either staged operation or modulation-type operation. For example, staged operation may have two flame settings while modulation-type operation may be incrementally adjustable over a large range of outputs, for example, from 40% to 100% output capacity. In general, the furnace 100 may be operated with any suitable gaseous fuel including, without limitation, natural gas or propane.

Within the mixing tube 116, the air and fuel may be mixed together to form a uniform or homogenous air/fuel. Accordingly, in this embodiment, the mixing tube 116 may comprise internal features downstream of air and fuel inlets that aid in the mixing of air and fuel within the mixing tube 116 by increasing downstream turbulence within the air/fuel mixture. The mixing of the air and fuel may also be aided by an active mixing device to encourage homogeneous mixing of the fuel and combustion air in the mixing tube 116. The air/fuel mixture may flow through the mixing tube 116 and into the intake manifold 118. The intake manifold 118 may supply the air/fuel mixture to the burner assembly 122 for combustion. The burner assembly 122 may comprise a mounting flange 136 and a plurality of cylindrical burners 124 extending perpendicularly therefrom. As shown in FIGS. 1 and 2, the mounting flange 136 may be sandwiched between the intake manifold 118 and the post-combustion chamber 126.

In this embodiment, each burner 124 may have an associated primary heat exchanger 128 for venting hot flue gases such that the primary heat exchanger 128 is in the combustion airflow path of its associated burner 124. While four corresponding burners 124 are provided in this embodiment, in general, the total number of burners 124 may vary depending upon the desired capacity of the furnace 100.

An igniter 138 mounted to the post-combustion chamber 126 may comprise an ignition tip positioned at an open end of one of the outer burners 124 (i.e., the burner 124 on the left side 106 or right side 108 of the furnace 100) to ignite the air/fuel mixture in that particular burner 124. The remaining burners 124 may be subsequently ignited via a flame carry over path extending between each pair of adjacent burners 124. In general, the igniter 138 may comprise any suitable device for inducing combustion of the air/fuel mixture within the burners 124 including, without limitation, a pilot light, a piezoelectric device, or a hot surface igniter. The igniter 138 may be controlled by a control system or may be manually ignited. In addition, a flame sensor (not shown) may be mounted to the intake manifold 118 proximal to the outer burner 124 furthest from the igniter 138. In other words, the igniter 138 and the flame sensor are positioned on opposite sides of the intake manifold 118. The flame sensor may detect when the flame front extends across each of the burners 124. The flame sensor may comprise a thermocouple, a flame rectification device, or any other suitable safety device.

The flame in the burners 124 may be counter-flow to the direction of combustion gas flow in the system, resulting in substantially all of the air/fuel mixture passing through the perforations in the burner assembly 122 to the flame. The combustion of the air/fuel mixture may occur substantially inside the burners 124 along the inner perforated surfaces of the burners 124.

In the manner described, the air and fuel mix upstream of the burners 124 in the mixing tube 116, then flow into the burners 124 for combustion. Accordingly, the air and fuel may be "premixed" prior to delivery to the burners 124. Alternatively, fuel may be injected at the burners 124 so that the fuel mixes with the air in the burners 124.

Each primary heat exchanger 128 may comprise a bent, S-shaped tubular member that extends through a tortuous path to enhance the surface area available for heat transfer with the surrounding circulation air. Each primary heat exchanger 128 may comprise a first open end 128a defining a flue gas inlet and a second open end 128b defining a flue gas outlet. The first open end 128a of each primary heat exchanger 128 may be attached to the post-combustion chamber 126 and may be axially opposed to the corresponding burner 124. The second open end 128b of each primary heat exchanger 128 may be attached to the secondary heat exchanger 130 so that the primary heat exchangers 128 transport hot flue gases from the post-combustion chamber 126 to the secondary heat exchanger 130. Although the primary heat exchangers 128 are tubular in some embodiments, the primary heat exchangers 128 may comprise, for example, clamshell, drum, shell and tube-type, and/or any other suitable type of heat exchangers.

In general, combustion air may be introduced into the furnace 100 either in induced draft mode by pulling air through the system or in forced draft mode by pushing air through the system. In this embodiment, induced draft mode may be employed by pulling the hot flue gases from the secondary heat exchanger 130 with a blower or fan 140 by creating a relatively lower pressure at the exhaust of the secondary heat exchanger 130. Alternatively, forced draft mode may be accomplished by placing the blower or fan 140 between the air/fuel mixing tube 116 and an intake manifold inlet connection flange 142 and forcing air into the system through the intake manifold 118. A control system may control the blower or fan 140 to an appropriate speed to achieve adequate air flow for a desired firing rate through the burners 124. Increasing the fan speed of the blower or fan 140 will introduce more air to the air/fuel mixture, thereby changing the characteristics of the combustion within the burners.

A circulation blower may blow circulation air across the primary heat exchangers 128 and the secondary heat exchanger 130 to enable the transfer of thermal energy from the primary heat exchangers 128 and the secondary heat exchanger 130 to the air. The heated, exiting airflow may then be distributed to a conditioned area. The furnace 100 is shown in a first orientation in which the circulation blower is nearer the bottom side 112 of the furnace 100 relative to the primary heat exchangers 128 and blows the circulation air across the primary heat exchangers 128 and up toward the top side 110 of the furnace 100.

While moving through the primary heat exchangers 128 and then the secondary heat exchanger 130, the hot flue gases may begin to cool and continue cooling as they move through a cold header 200 and then the blower or fan 140. Finally, the flue gases may move through an exit pipe 144, then through a flue pipe (not shown), and exit out the flue pipe to the outside environment. As the flue gases cool throughout the primary heat exchanger 128, secondary heat exchanger 130, and cold header 200, however, the flue gases may cool below the dew point temperature of the water vapor, which may be mixed with the other combustion products, producing condensate. Accordingly, this system may be referred to as a condensing gas-fired furnace 100. The cold header 200 may provide a drainage path for managing and/or draining the condensate and/or any other liquid.

Referring now to FIGS. 3-13, the cold header 200 may generally comprise a front side 202, rear side 204, left side 206, right side 208, top side 210, and bottom side 212 consistent with the sides of the furnace 100. The cold header 200 may comprise a left drain trap 214, a center housing 216, and a right drain trap 218, each of which may be substantially rectangular in shape and may similarly comprises front sides, rear sides, left sides, right sides, top sides, and bottom sides generally consistent in orientation with the sides of the furnace 100. The left drain trap 214 may extend from the bottom left of the cold header 200, and the right drain trap 218 may extend from the top right of the cold header 200 so that the left drain trap 214 and the right drain trap 218 are substantially diagonal to each other with respect to the center housing 216. The cold header 200 may comprise on its rear side 204 a first open end 220 that may be coupled to the secondary heat exchanger 130 and on its front side 202 a second open end 222 that may be coupled to the fan 140. The left drain trap 214 may comprise a first drain outlet 224 and a second drain outlet 226, which may be opposed to each other with respect to the left drain trap 214. The right drain trap 218 may comprise a third drain outlet 228 and a fourth drain outlet 230, which may be opposed to each other with respect to the right drain trap 218. The first drain outlet 224, second drain outlet 226, third drain outlet 228, and fourth drain outlet 230 may be equal in size. The cold header 200 may comprise a plurality of inlet vents 232 and mounting brackets 234. The mounting brackets 234 may allow for mounting the cold header 200 to the fan 140 on the front side 202 and the partition panel 120 on the rear side 204. The inlet vents 232 may promote proper pressure throughout the cold header 200. The center housing 216 may comprise a cavity 236 at least partially defined by a left wall 238, right wall 240, top wall 242, and bottom wall 244.

Figure 10:
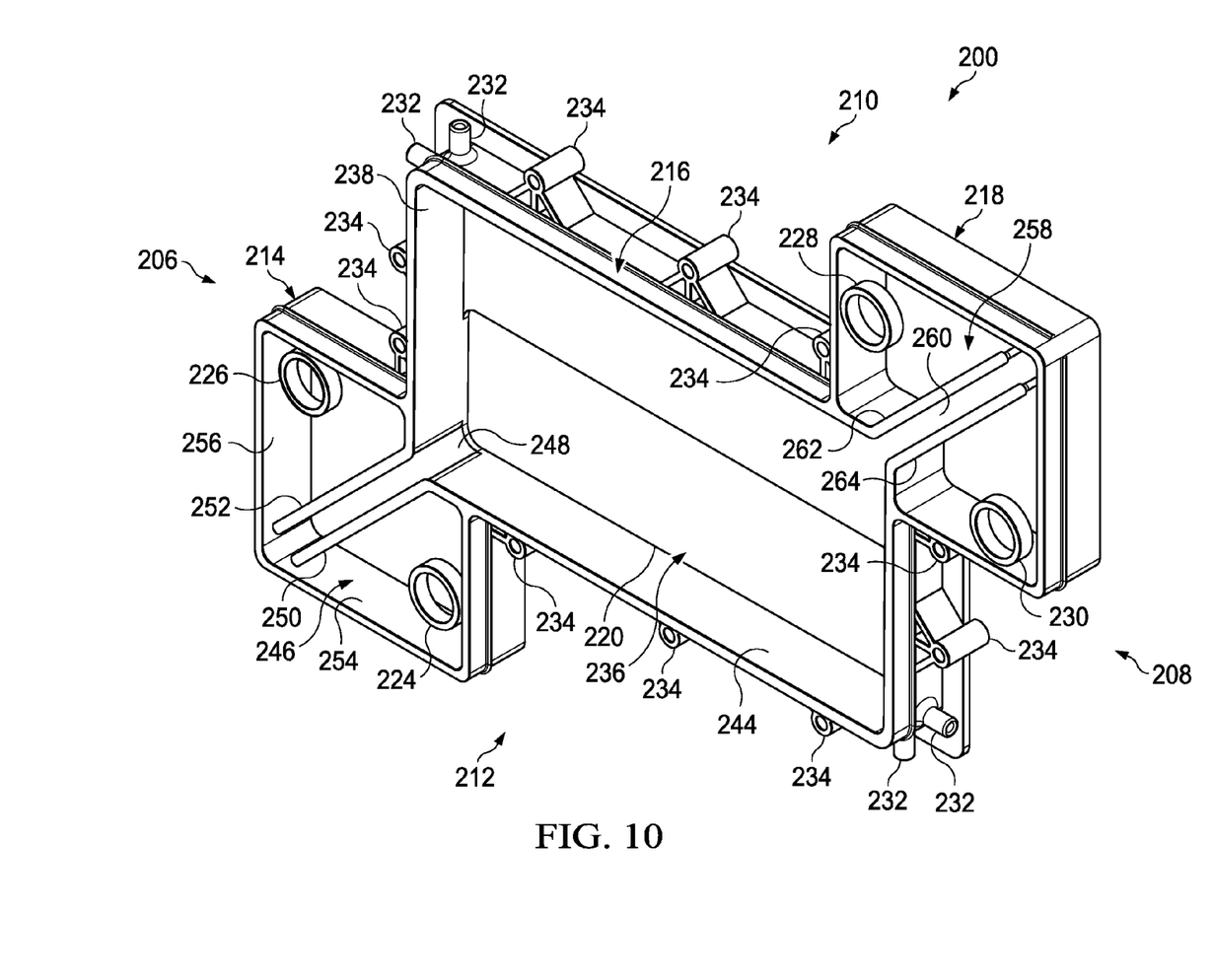
FIG. 10 is a cut-away oblique front-top view of the cold header of FIG. 3.
Figure 11:
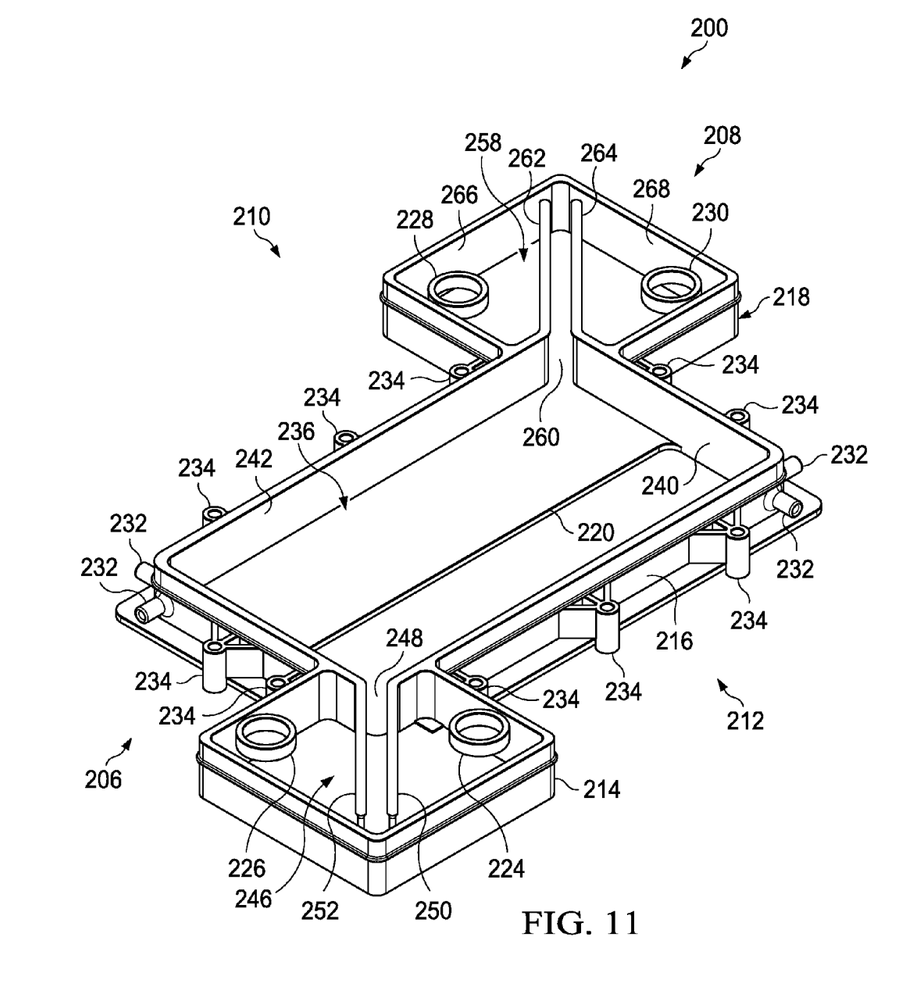
FIG. 11 is a cut-away oblique front-bottom view of the cold header of FIG. 3.

Referring now to FIGS. 10 and 11, a cut-away view of the cold header 200 is shown with the front wall 238 of the cold header 200 removed. The left drain trap 214 may comprise a first reservoir 246 intersected by a first condensate channel 248 defined by a first partition 250 and a second partition 252 for directing condensate. The first partition 250 and the second partition 252 may be substantially parallel to each other and terminate without contacting a first floor 254 and a second floor 256 of the left drain trap 214. The first partition 250 and the second partition 252 may extend substantially normal to, and provide a fluid-tight seal with, the front side 202 and the rear side 204. The right drain trap 218 may comprise a second reservoir 258 intersected by a second condensate channel 260 defined by a third partition 262 and a fourth partition 264 for directing condensate. The third partition 262 and the fourth partition 264 may be substantially parallel to each other and may terminate without contacting a third floor 266 and a fourth floor 268 of the right drain trap 218. The third partition 262 and the fourth partition 264 may extend substantially normal to, and provide a fluid-tight seal with, the front side 202 and the rear side 204. The first condensate channel 248 and the second condensate channel 260 may be located substantially diagonal to each other with respect to the center housing 216.

In operation, condensate that forms in the primary heat exchangers 128 and the secondary heat exchanger 130 may be pulled by the blower or fan 140 through the first open end 220 and into the cavity 236 of the center housing 216. Gravity may pull the condensate to the bottom wall 244 of the cavity 236. In the first orientation, the upflow orientation of the furnace 100 shown in FIGS. 1 and 2, gravity may then pull the condensate through the first condensate channel 248, onto the first floor 254, and into the first reservoir 246 of the left drain trap 214.

Figure 12:
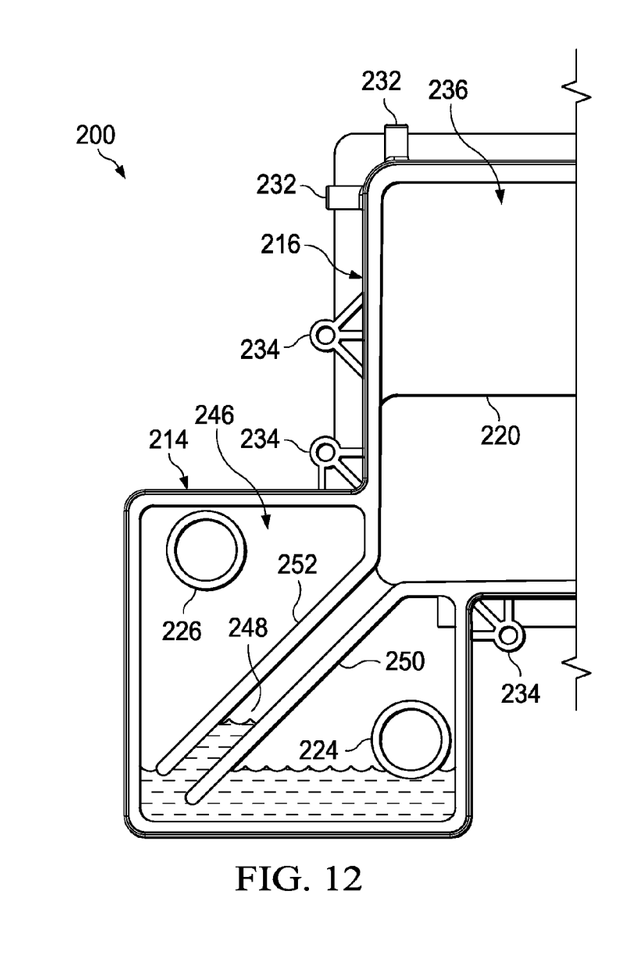
FIG. 12 is a cut-away orthogonal front view of the cold header of FIG. 3 showing the left drain trap.
Figure 13:
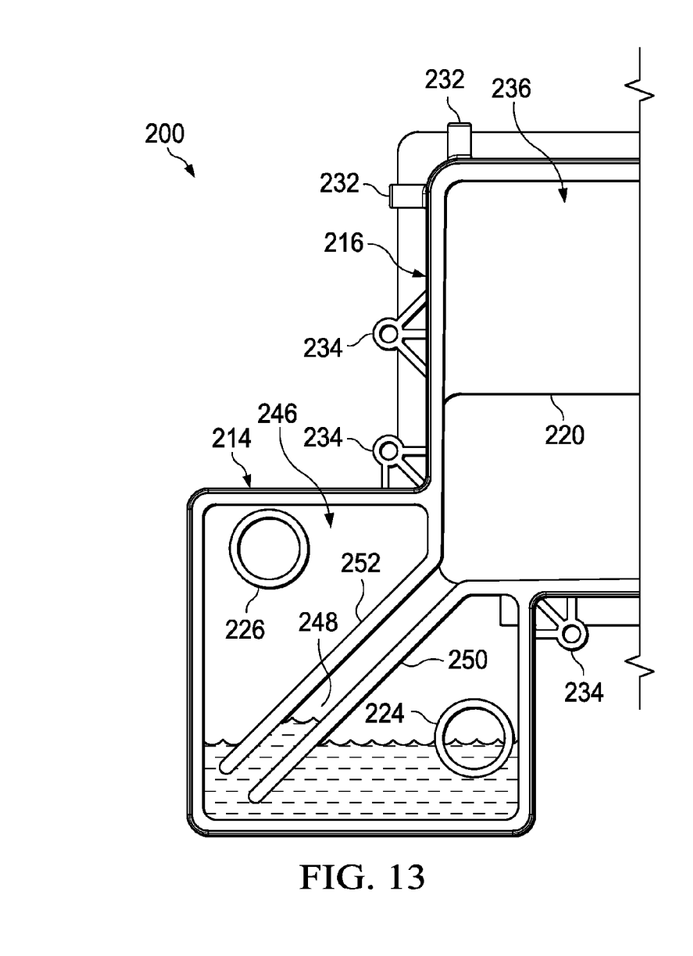
FIG. 13 is another cut-away orthogonal front view of the cold header of FIG. 3 showing the left drain trap.

Referring now to FIG. 12, the condensate may begin to pool in the first reservoir 246, but the condensate may not yet drain as it may have not yet reached the height of the first drain outlet 224. Referring now to FIG. 13, once the condensate pools enough in the first reservoir 246 to reach the height of the first drain outlet 224, the condensate may drain out the first drain outlet 224. The condensate may then continue to move through PVC or other pipe and, for example, enter a common drain connected to a sewage system. The formation of the condensate in the left drain trap 214 may prevent gases from exiting into the conditioned space and may prevent outside air from entering into the furnace 100.

While FIGS. 1 and 2 demonstrate an upflow orientation of the furnace 100, the cold header 200 may be designed to drain condensate even with the furnace 100 configured in a plurality of other orientations. Accordingly, if the furnace 100 of FIGS. 1 and 2 were rotated 90 degrees counterclockwise, as viewed from the front side 102, the furnace 100 may be considered to be configured in a so-called horizontal left orientation because the circulation air blower may blow the circulation air from right to left. Referring back to FIG. 10, if the furnace 100 were configured in the horizontal left orientation, gravity may pull the condensate to the left wall 238 of the cold header 200 and then pull the condensate through the first condensate channel 248, onto the second floor 256, and into the first reservoir 246 of the left drain trap 214. Once the condensate pools enough in the first reservoir 246 to reach the height of the second drain outlet 224, the condensate may drain out the second drain outlet 224.

If the furnace 100 of FIGS. 1 and 2 were rotated 180 degrees, as viewed from the front side 102, the furnace 100 may be considered to be configured in a so-called downflow orientation because the circulation air blower may blow the circulation air down from the top to the bottom. Referring back to FIG. 11, in the downflow orientation, gravity may pull the condensate to the top wall 242 of the cold header 200 and then pull the condensate through the second condensate channel 260, onto the third floor 266, and into the second reservoir 258 of the right drain trap 218. Once the condensate pools enough in the second reservoir 258 to reach the height of the third drain outlet 228, the condensate may drain out the second drain outlet 228.

If the furnace 100 of FIGS. 1 and 2 were rotated 90 degrees clockwise, as viewed from the front side 102, the furnace 100 may be considered to be configured in a so-called a horizontal right orientation of the furnace 100 occurs because the circulation air blower blows the circulation air from left to right. Referring back to FIG. 11, in the horizontal right orientation, gravity may pull the condensate to the right wall 240 of the cold header 200 and then pull the condensate through the second condensate channel 260, onto the fourth floor 268, and into the second reservoir 258 of the right drain trap 218. Once the condensate pools enough in the second reservoir 258 to reach the height of the fourth drain outlet 230, the condensate may drain out the fourth drain outlet 230.

Figure 14:
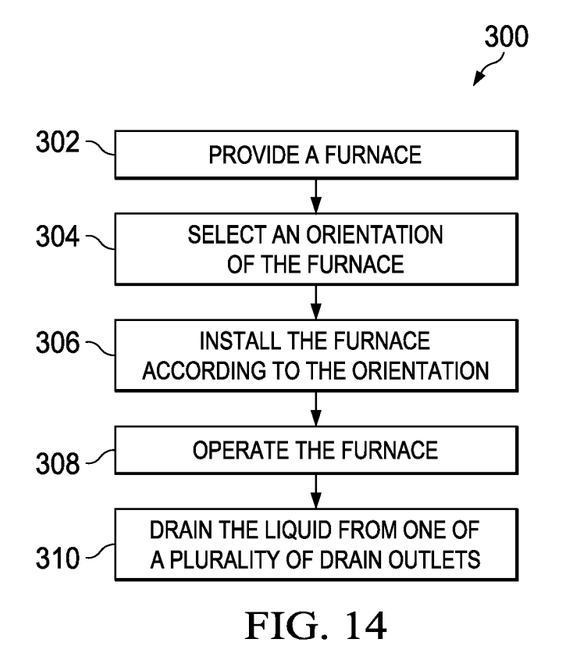
FIG. 14 is a flowchart of a method for managing liquid according to an embodiment of the disclosure.

Referring now to FIG. 14, a method 300 for managing condensate according to an embodiment of the disclosure is shown. At block 302, a furnace may be provided. The furnace may be the furnace 100 described above. The furnace may comprise a cold header substantially similar to the cold header 200 described above. The cold header may comprise a center housing comprising a cavity to receive liquid therein, and at least one drain trap connected to the center cavity. The drain trap may comprise two partitions substantially parallel to each other and the partitions may define a channel configured to receive liquid from the cavity. The drain trap may be associated with a plurality of drain outlets.

At block 304, one of a plurality of furnace orientations may be selected. The selected orientation may comprise an upflow orientation as described above.

At block 306, the furnace may be installed according to the upflow orientation.

At block 308, the furnace may be operated. Upon operation, the furnace may cause liquid to form in at least one of primary heat exchangers, a secondary heat exchanger, and the cold header. The primary heat exchangers may be the primary heat exchangers 128 and the secondary heat exchanger may be the secondary heat exchanger 130. Liquid may then collect in the cold header.

At block 310, liquid may drain from one of the plurality of drain outlets associated with the drain trap.

Four substantially orthogonal orientations for the furnace 100 comprising the cold header 200 are described above. In alternative embodiments, the cold header 200 may comprise only a single drain trap, which may allow for two orientations. In that case, the single drain trap may be in a bottom corner of the cold header 200 and have a single condensate path with two drain outlets allowing for two orientations that may be selectively utilized by rotating the furnace 100 and/or cold header 200 by substantially 90 degrees relative to each other. Though an installer may determine the orientation of the furnace 100 before an initial installation, the cold header 200 may allow for easy rotation of the furnace 100 to subsequently accommodate other orientations, which need not be substantially orthogonal. The cold header 200 may also be contoured or slanted towards a single drain trap to allow for improved gravity-fed draining. When a particular orientation is selected, the installer may plug the drain outlets that are not associated with draining condensate in the selected orientation and the plugs may ensure that unwanted airflow does not impede the proper draining of the condensate. The cold header 200 may be described as comprising each of a horizontal bisection plane and a vertical bisection plane. While some embodiments of the cold header may comprise (1) a first drain trap located below the horizontal bisection plane and to the left of the vertical bisection plane and (2) a second drain trap located above the horizontal bisection plane and to the right of the vertical bisection plane, alternative embodiments may comprise (1) a first drain trap located above the horizontal bisection plane and to the left of the vertical bisection plane and (2) a second drain trap located below the horizontal bisection plane and to the right of the vertical bisection plane. In yet other alternative embodiments, a cold header may comprise (1) a first drain trap located above the horizontal bisection plane and to the left of the vertical bisection plane, (2) a second drain trap located above the horizontal bisection plane and to the right of the vertical bisection plane, (3) a third drain trap located below the horizontal bisection plane and to the left of the vertical bisection plane, and (4) a fourth drain trap located below the horizontal bisection plane and to the right of the vertical bisection plane.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A furnace, comprising:
   a first drain trap;
   a first drain outlet associated with the first drain trap;
   a second drain outlet associated with the first drain trap;
   a first condensate channel extending at least partially into the first drain trap, wherein the first drain outlet and the second drain outlet are disposed on substantially opposing sides of the first condensate channel;
   a second drain trap;
   a third drain outlet associated with the second drain trap;
   a fourth drain outlet associated with the second drain trap; and
   a second condensate channel extending at least partially into the second drain trap, wherein the third drain outlet and the fourth drain outlet are disposed on substantially opposing sides of the second condensate channel;
   wherein the first drain trap is disposed substantially diagonally from the second drain trap with respect to a center housing;
   wherein the first drain outlet and the second drain outlet are located relative to the first drain trap so that gravity driven drainage of a liquid from the first drain trap is selectable between the first drain outlet and the second drain outlet in response to a rotational change in an orientation of the furnace; and
   wherein the third drain outlet and the fourth drain outlet are located relative to the second drain trap so that gravity driven drainage of a liquid from the second drain trap is selectable between the third drain outlet and the fourth drain outlet in response to a rotational change in an orientation of the furnace.

2. The furnace of claim 1, wherein each of the first drain trap, the first drain outlet, and the second drain outlet are substantially fixed relative to each other.

3. The furnace of claim 1, further comprising:
a cold header comprising each of the first drain trap, the first drain outlet, and the second drain outlet.

4. The furnace of claim 1, wherein the first drain outlet and the second drain outlet are substantially equal in size.

5. The furnace of claim 1, further comprising:
A cold header comprising each of the first drain trap, the first drain outlet, the second drain outlet, the second drain trap, the third drain outlet, and the fourth drain outlet.

6. A cold header for a furnace, comprising:
a center housing;
a first drain trap in fluid communication with the center housing via a first condensate channel;
a first drain outlet in fluid communication with the first drain trap;
a second drain outlet in fluid communication with the first drain trap;
a second drain trap in fluid communication with the center housing via a second condensate channel;
a third drain outlet in fluid communication with the second drain trap; and
a fourth drain outlet in fluid communication with the second drain trap;
wherein the first drain outlet and the second drain outlet are disposed on substantially opposing sides of the first condensate channel;
wherein the third drain outlet and the fourth drain outlet are disposed on substantially opposing sides of the second condensate channel;
wherein the first drain trap is disposed substantially diagonally from the second drain trap with respect to the center housing;
wherein the first drain outlet and the second drain outlet are located relative to the first drain trap so that gravity driven drainage of a liquid from the first drain trap is selectable between the first drain outlet and the second drain outlet in response to a 90 degree rotational change in an orientation of the cold header; and
wherein the third drain outlet and the fourth drain outlet are located relative to the second drain trap so that gravity driven drainage of a liquid from the second drain trap is selectable between the third drain outlet and the fourth drain outlet in response to a rotational change in an orientation of the cold header.

7. The cold header of claim 6, wherein each of the first drain trap, the first drain outlet, and the second drain outlet are substantially fixed relative to each other.

8. The cold header of claim 6, wherein the first drain outlet and the second drain outlet are substantially equal in size.

9. The cold header of claim 6, further comprising:
wherein each of the first drain trap, the first drain outlet, the second drain outlet, the second drain trap, the third drain outlet, and the fourth drain outlet are substantially fixed relative to each other.

10. The cold header of claim 6, wherein (1) each of the first drain trap, the first drain outlet, and the second drain outlet are located offset from a horizontal bisection plane of the cold header in a first offset direction and are located offset from a vertical bisection plane of the cold header in a second offset direction and (2) each of the second drain trap, the third drain outlet, and the fourth drain outlet are located offset from the horizontal bisection plane in a third offset direction opposite the first offset direction and are located offset from the vertical bisection plane in a fourth offset direction opposite the second offset direction.

11. The cold header of claim 6, wherein each of the first drain outlet, the second drain outlet, the third drain outlet, and the fourth drain outlet are substantially the same size.

12. A method of managing drainage of a liquid in a furnace, the method comprising:
providing a furnace comprising a cold header comprising a first drain trap, a first drain outlet associated with the first drain trap, a second drain outlet associated with the first drain trap, a first condensate channel extending at least partially into the first drain trap, a second drain trap, a third drain outlet associated with the second drain trap, a fourth drain outlet associated with the second drain trap, and a second condensate channel extending at least partially into the second drain trap, wherein the first drain outlet and the second drain outlet are disposed on substantially opposing sides of the first condensate channel, wherein the third drain outlet and the fourth drain outlet are disposed on substantially opposing sides of the second condensate channel, wherein the first drain trap is disposed substantially diagonally from the second drain trap with respect to a center housing, wherein the first drain outlet and the second drain outlet are located relative to the first drain trap so that gravity driven drainage of a liquid from the first drain trap is selectable between the first drain outlet and the second drain outlet in response to a rotation of the cold header, and wherein the third drain outlet and the fourth drain outlet are located relative to the second drain trap so that gravity driven drainage of a liquid from the second drain trap is selectable between the third drain outlet and the fourth drain outlet in response to a rotational change of the cold header; and
changing an orientation of the furnace by rotating the furnace 90 degrees to select between the first drain outlet and the second drain outlet through which gravity driven drainage shall occur.

13. The method of claim 12, further comprising:
sealing the one of the first drain outlet and the second drain outlet through which gravity driven drainage is not selected to occur.

14. The method of claim 12, further comprising:
changing an orientation of the furnace by rotating the furnace an additional 90 degrees to select between the first drain trap and the second drain trap through which gravity driven drainage shall occur.

15. The method of claim 14, further comprising:
changing an orientation of the furnace by rotating the furnace an additional 90 degrees to select between the third drain trap and the fourth drain trap through which gravity driven drainage shall occur.

* * * * *